(12) United States Patent
Xu et al.

(10) Patent No.: US 12,134,670 B2
(45) Date of Patent: Nov. 5, 2024

(54) COMPOSITION USED IN 3D PRINTING SYSTEM, ITS APPLICATION THEREOF

(71) Applicant: BASF SE, Ludwigshafen am Rhein (DE)

(72) Inventors: Hang Xu, Chigasaki (JP); Sheng Zhong Zhou, Shanghai (CN); Stefan Hirsemann, Shanghai (CN)

(73) Assignee: BASF SE (DE)

( * ) Notice: Subject to any disclaimer, the term of this patent is extended or adjusted under 35 U.S.C. 154(b) by 564 days.

(21) Appl. No.: 16/608,261

(22) PCT Filed: Apr. 16, 2018

(86) PCT No.: PCT/EP2018/059654
§ 371 (c)(1),
(2) Date: Oct. 25, 2019

(87) PCT Pub. No.: WO2018/197248
PCT Pub. Date: Nov. 1, 2018

(65) Prior Publication Data
US 2020/0181303 A1 Jun. 11, 2020

(30) Foreign Application Priority Data
Apr. 25, 2017 (WO) ................ PCT/CN2017/081898

(51) Int. Cl.
| | |
|---|---|
| *C08F 220/06* | (2006.01) |
| *B29C 64/40* | (2017.01) |
| *B29K 33/00* | (2006.01) |
| *B33Y 10/00* | (2015.01) |
| *B33Y 70/00* | (2020.01) |
| *C08F 220/04* | (2006.01) |
| *C08F 220/28* | (2006.01) |

(52) U.S. Cl.
CPC ............ *C08F 220/06* (2013.01); *B29C 64/40* (2017.08); *B33Y 10/00* (2014.12); *B33Y 70/00* (2014.12); *C08F 220/04* (2013.01); *C08F 220/282* (2020.02); *B29K 2033/12* (2013.01); *C08F 220/281* (2020.02)

(58) Field of Classification Search
CPC .... C08F 220/06; C08F 220/04; C08F 220/20; C08F 220/281; C08F 220/282; B29C 64/40; B33Y 10/00; B33Y 70/00; B29K 2033/12
See application file for complete search history.

(56) References Cited

U.S. PATENT DOCUMENTS

| | | | | |
|---|---|---|---|---|
| 2002/0099156 | A1* | 7/2002 | Baxter | ............... C08F 6/006 526/229 |
| 2002/0167100 | A1* | 11/2002 | Moszner | ............ A61K 6/887 264/16 |
| 2007/0168815 | A1 | 7/2007 | Napadensky et al. | |
| 2012/0309920 | A1* | 12/2012 | Funk | ............... C08F 220/06 526/318.42 |

(Continued)

FOREIGN PATENT DOCUMENTS

| | | | |
|---|---|---|---|
| EP | 2636511 | A1 | 9/2013 |
| WO | WO-2015175682 | A1 | 11/2015 |

(Continued)

OTHER PUBLICATIONS

International Search Report for PCT/EP2018/059654 mailed Jun. 20, 2018.

(Continued)

*Primary Examiner* — Timothy Kennedy
*Assistant Examiner* — Inja Song
(74) *Attorney, Agent, or Firm* — Faegre Drinker Biddle & Reath LLP

(57) ABSTRACT

The present invention provides a composition comprising at least one monomer of Formula I, at least one monomer of Formula II, and at least one alkali metal salt of Formula III and/or Formula IV

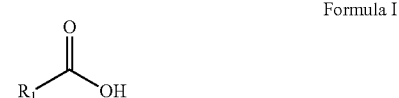

Formula I

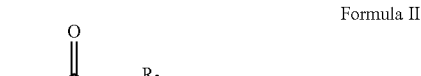

Formula II

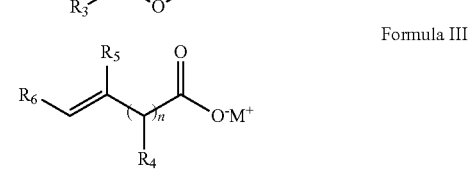

Formula III

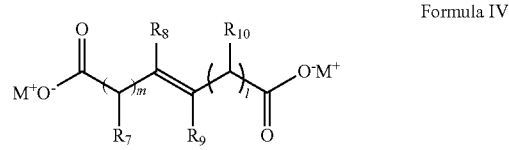

Formula IV The present invention also provides a process of fabricating a three-dimensional object, comprising i) dispensing a build material that comprises a model material composition and a support material composition; ii) curing the layer dispensed in step i); iii) repeating step i) and ii) so as to sequentially form a plurality of layers in a configured pattern correspond- (Continued)

ing to the shape of the object; and iv) removing the support material from the build material.

18 Claims, No Drawings

(56) References Cited

U.S. PATENT DOCUMENTS

| | | | | |
|---|---|---|---|---|
| 2013/0017945 | A1* | 1/2013 | Braun | C08F 2/26 |
| | | | | 502/7 |
| 2016/0200908 | A1* | 7/2016 | Osaka | C08L 39/06 |
| | | | | 524/556 |
| 2017/0321032 | A1* | 11/2017 | Shimizu | C08K 3/32 |
| 2019/0009453 | A1 | 1/2019 | Kitou et al. | |
| 2019/0241684 | A1* | 8/2019 | Tsujino | B33Y 10/00 |

FOREIGN PATENT DOCUMENTS

| | | | | |
|---|---|---|---|---|
| WO | WO-2016030761 | A2 * | 3/2016 | B29C 35/0805 |
| WO | WO-2017018453 | A1 | 2/2017 | |

OTHER PUBLICATIONS

Written Opinion of the International Searching Authority for PCT/EP2018/059654 mailed Jun. 20, 2018.

* cited by examiner

COMPOSITION USED IN 3D PRINTING SYSTEM, ITS APPLICATION THEREOF

CROSS-REFERENCE TO RELATED APPLICATIONS

This application is a national stage application (under 35 U.S.C. § 371) of PCT/EP2018/059654, filed Apr. 16, 2018, which claims benefit of International Application No. PCT/CN2017/081898, filed Apr. 25, 2017, both of which are incorporated herein by reference in their entirety.

TECHNICAL FIELD

The present invention relates to a composition to form support materials for 3D (three dimensional) printing and the application of said composition in 3D printing process as well as the resultant 3D object.

BACKGROUND ART 3D (three dimensional) printing is an additive manufacturing technology to form a three dimensional object under the control of computer programs. The materials of 3D printing mainly include thermal plastics, UV light curable resins, rubbers, metals, and ceramic and so son. For 3D printing of UV light curable resins, technologies such as Inkjet Printer System (IPS), Stereolithography (SLA) and Continuous Liquid Interface Production (CLIP) are often used.

In IPS and SLA technologies, the build materials are UV light curable resins that are printed out in liquid and rapidly cured by UV light. If the object has complicated shape like hollow structures or high overhang, support materials are required to hold build materials in place during the printing process. After the printing is finished, the support materials shall be removed from the object. If such removal is difficult, it might cause the dimensional inaccuracy and even shape distortion of the object. Therefore, easily removable support materials are critical for high definition printing.

In IPS technology, UV light curable polymers are sprayed onto the surface of the scaffold in extremely thin layer and such layer is cured with UV light immediately. The support materials for complicated geometries are removed afterwards. In SLA technology, UV laser is focused on a vat of UV light curable polymer resins to draw a shape onto the surface of the UV light curable polymer vat according to the design program set in advance. The UV light curable polymer contacted with UV light is cured to form a single layer and such process is repeated to reach a 3D object. SLA technology requires support materials to prevent deflection of build materials due to the gravity in bottom-up printing.

Patent US 2007/0168815A1 disclosed a composition suitable for support in build a 3D object comprising at least one non-reactive and low-toxicity component, at least one surface-active agent and at least one stabilizer, and further comprising at least one reactive component and at least one UV light initiator. The composition is formulated to be compatible for use with ink-jet printers. In more details, "first interface material" and "second interface material" that have different dynamic modulus are jetted from separated nozzles and form construction layer, support layer and release layer by combination in different ratios. For instance, in order to produce the support layers that have a lower dynamic modulus than the construction layers, a combination that includes 30-70% of the first interface material and 70-30% of the second interface material may be used.

The technology of US 2007/0168815A1 needs to prepare two formulations of "first interface material" and "second interface material" respectively and adjust the ratio of the two formulations to reach a support material, which makes the application complicated. Moreover, such formulations are designed for ink-jet printers and therefore not applicable for other 3D printing technologies such as SLA. Furthermore, US 2007/0168815A1 did not have experimental data of removing the support and/or release layers from the construction layers but only mentioned in the embodiment, for example, that the second interface material is formulated to form a release layer to permit a manual easy separation or cleaning of the three-dimensional object from its support. It shows, a manual separation is still required to remove support and/or release layers from construction layers.

Therefore, it is still required to provide a composition to form a support material in 3D printing that is easy to prepare and remove from the build materials and applicable for different 3D printing technologies.

SUMMARY OF INVENTION

In one aspect, the present invention is to provide a composition comprising:

a) 10% to 30% by weight of at least one monomer of Formula I:

Formula I wherein $R_1$ is a $C_2$-$C_8$ alkenyl group with or without substitution of a carboxyl group;

b) 10% to 30% by weight of at least one monomer of Formula II:

Formula II wherein $R_2$ is a $C_1$-$C_{18}$ alkyl group with or without substitution of a hydroxy group, a 2-(2-ethoxyethoxy) group or a $C_1$-$C_8$ alkoxy group, a $C_2$-$C_8$ alkenyl group, a cyclohexyl group, or a tetrahydrofurfuryl group; $R_3$ is a $C_1$-$C_8$ alkyl group or a $C_2$-$C_8$ alkenyl group and the total number of unsaturated bond in $R_2$ and $R_3$ is 1;

c) 5% to 15% by weight of at least one alkali metal salt of Formula III and/or Formula IV;

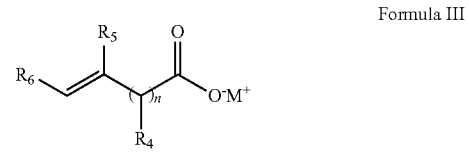

Formula III

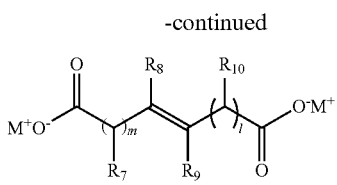

Formula IV wherein M is alkali metal selected from sodium, potassium and lithium; $R_4$, $R_5$, $R_6$, $R_7$, $R_8$, $R_9$ and $R_{10}$ are independently of each other hydrogen, methyl or ethyl group; n, m and l are independently of each other integer number from 0 to 3;

d) 0.5% to 10% by weight of at least one water soluble polyvalent metallic cation;

e) 1% to 10% by weight of at least one polymerization initiator; and f) 20% to 50% by weight of water, and the weight percentage of component a), b), c), d) ore) is based on the total weight of the composition.

In another aspect, the present invention is a process of fabricating a three-dimensional object, comprising i) dispensing a build material that comprises a model material composition and a support material composition; ii) curing the layer dispensed in step i); iii) repeating step i) and ii) so as to sequentially form a plurality of layers in a configured pattern corresponding to the shape of the object; and iv) removing the support material from the build material.

In a further aspect, the present invention is a three-dimensional object obtained by the process of fabricating a three-dimensional object.

DETAILED DESCRIPTION OF INVENTION

Technical Problem 3D printing technologies such as Inkjet Printer System (IPS), Stereolithography (SLA) use UV light curable polymers as build materials and require support material to print objects having complicated shapes. The support materials need to meet lots of requirements such as low dynamic viscosity before curing, fast curing speed, sufficient mechanical properties after curing and easily removing from the build materials. However, the state of the art did not provide a support material that is able to meet all requirements in 3D printing technologies.

Solutions to Problem

Compared with the state of art i.e. the support material is removed by swelling and/or manual separation, the present invention provided a composition to form support materials that are fast and completely dissolved in acidic aqueous solutions and at the same time has sufficient mechanical properties like Dynamic Modulus.

The core chemistry in the present invention is the coordination between polyvalent metallic cations and carboxyl group in acrylic acid. The polyvalent metallic cations like $Fe^{3+}$ play a role of physical crosslinking agent, which makes the cured composition have sufficient mechanical properties and at the same time are fast dissolving by acidic aqueous solution or other solutions containing ligand compound of chelation that has stronger interaction force with polyvalent metallic cations than carboxyl groups. The term "physical crosslinking" means the crosslink is formed via inter-molecular force instead of chemical bond. The term "ligand compound of chelation" means an ion or molecule or functional group that binds to a central metallic cation to form a coordination complex.

The monomer of Formula I provides crosslink points i.e. carboxyl groups for physical crosslinking with polyvalent metallic cations. Preferably, the monomer of Formula I is selected from acrylic acid, methacrylic acid, crotonic acid, maleic acid, allylacetic acid, 3-butenoic acid and 2-heptenoic acid or a mixture thereof.

The weight percentage of the monomer of Formula I is from 10% to 30% by weight based on the total weight of the composition. If the content of the monomer of Formula I is less than 10%, after curing the composition tends to have low Dynamic modulus. If the content of the monomer of Formula I is more than 30%, before curing the composition tends to have a high dynamic viscosity, which brings difficulties to printing and moreover after curing the degree of crosslink is too high to make the dissolving in acidic aqueous solution slow and incomplete.

The monomer of Formula II is introduced to dilute the crosslink points i.e. carboxyl groups provided by the monomer of Formula I. Preferably, the monomer of Formula II is selected from allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2-hydroxypropyl (meth)acrylate, 3-hydroxypropyl (meth)acrylate, 2-methoxyethyl (meth)acrylate, 2-ethoxyethyl (meth)acrylate, 2-ethoxypropyl (meth)acrylate, 3-ethoxypropyl (meth)acrylate, tetrahydrofurfuryl (meth)acrylate, 2-(2-ethoxyethoxy) ethyl acrylate, cyclohexyl (meth)acrylate and isodecyl acrylate or a mixture thereof.

The weight percentage of the monomer of Formula II is from 10% to 30% by weight based on the total weight of the composition. If the content of the monomer of Formula II is less than 10%, before curing the composition tends to have a high dynamic viscosity and the printing process turns difficult. If the content of the monomer of Formula II is more than 30%, the crosslink points i.e. carboxyl groups provided by the monomer of Formula I are over diluted, which weakens the physical crosslinking with the polyvalent metallic cations and leads to a cured composition having insufficient mechanical properties.

All water soluble polyvalent metallic salts could be used to generate polyvalent metallic cations in the present invention. The term "water soluble" means the solubility in water of 100 g is not less than 1 g at 20° C. under 101.325 KPa. After dissolving in water, the free polyvalent metallic cations are formed that play a role of crosslinking agent for physical crosslinking between carboxyl groups. Preferably, the water soluble polyvalent metallic cations are selected from ferric cation, calcium cation, aluminum cation, magnesium cation or a mixture thereof.

The weight percentage of the polyvalent metallic cations is from 0.5% to 5% by weight based on the total weight of the composition. If the content of the polyvalent metallic cations is less than 0.5%, the crosslinking degree is too low to form a support material having sufficient mechanical properties. If the content of the polyvalent metallic cations is more than 5%, the crosslinking degree is too high and as a consequence the support material is hard to be fast and completely dissolved in the acidic aqueous solutions.

Examples of compounds providing polyvalent metallic cations include ferric (meth)acrylate, calcium (meth)acrylate, aluminum (meth)acrylate, magnesium (meth)acrylate, ferric acetate, calcium acetate, aluminum acetate, magnesium acetate, ferric trifluoroacetate, calcium trifluoroacetate, aluminum trifluoroacetate, magnesium trifluoroacetate, ferric chloride, calcium chloride, aluminium chloride, magnesium chloride, ferric sulfate and aluminium sulfate.

The alkali metal salt of Formula III and/or Formula IV takes part in co-polymerization and the obtained polymers contain repeated units of the alkali metal salt of Formula III and/or Formula IV. The existing of such repeated units makes the support materials dissolve much easier in the acid aqueous solutions. The weight percentage of the alkali metal salt of Formula III and/or Formula IV is from 5% to 15% by weight based on the total weight of the composition. If the content of the alkali metal salt of Formula III and/or Formula IV is less than 5%, the obtained support material tends to dissolve difficultly in the acid aqueous solution. However, if the content of the alkali metal salt of Formula III and/or Formula IV is more than 15%, the alkali metal salt of Formula III and/or Formula IV tends to be precipitated from the water solution.

Preferably, the alkali metal salt of Formula III and/or Formula IV is selected from sodium acrylate, potassium acrylate, lithium acrylate, pentenoic acid sodium salt, crotonic acid sodium salt, 2-butenedioic acid disodium salt and potassium crotonate or a mixture thereof.

The composition is cured by either UV light polymerization or thermalpolymerization. In thermal polymerization, redox initiator is used to trigger the polymerization reactions. Preferably, the polymerization initiator is redox initiator composed of at least one oxidant agent selected from sodium persulfate, lithium persulfate, potassium persulfate, ferric persulfate, magnesium persulfate, ammonium persulfate and at least one reducing agent selected from sodium sulfite, sodium bisulfite, potassium sulfite, potassium bisulfite, lithium sulfite, lithium bisulfite, ammonium sulfite, ammonium bisulfite, ferrous sulfate, ferrous chloride and the molar ratio of oxidant agent and reducing agent is from 1 to 1.2.

In UV light polymerization, UV light initiator is used to trigger the polymerization reactions. Preferably, the polymerization initiator is UV light initiator selected from benzoin methyl ether, benzoin ethyl ether and benzoin isopropyl ether, benzoin phenyl ether and benzoin acetate, acetophenone, 2,2-dimethoxyacetophenone and 1-dichloroacetophenone, benzil dimethyl ketal and benzil diethyl ketal, 2-methylanthraquinone, 2-ethylanthraquinone, 2-tert-butylanthraquinone, 1-chloroanthraquinone and 2-amylanthraquinone, 2,4,6-trimethylbenzoyldiphenylphosphine oxide, benzophenone and 4,4'-bis(N, N'-dimethy-lamino)benzophenone, 1-chloro-4-propoxy-9H-thioxanthen-9-one, 2-chlorothioxanthen-9-one, 2,4-diethyl-9H-thioxanthen-9-one, isopropyl-9H-thioxanthen-9-one, 10-methylphenothiazine, thioxanthen-9-one, 9(10H)-acridanone, 1-phenyl-1, 2-propanedione-2-O-benzoyloxime, 1-aminophenyl ketones, 1-hydroxycyclohexyl phenyl ketone, phenyl-1-hydroxyisopropylketone and 4-isopropylphenyl-1-hydroxyisopropylketone or a mixture thereof.

The radical polymerization takes place in the curing process. The polymerization initiator creates "active centers of polymerization reactions" that are places the monomers are added into the polymer chains. The term "active centers of polymerization reactions" means the end of monomers, oligomers or polymer chains having active radicals that are going to take reaction with monomers to make the oligomer or polymer chains grow. Either redox initiators activated by thermal or UV light initiators activated by UV light create the "active centers of polymerization reactions". In present invention, the radical polymerization takes place in the water solution and therefore certain percentage of the "active centers of polymerization reactions" tend to be quenched by oxygen.

The weight percentage of the polymerization initiator is from 2% to 10% by weight based on the total weight of the composition. If the content of the polymerization initiator is lower than 2%, the concentration of the "active centers of polymerization reactions" are not sufficient to make all monomers polymerized and therefore the obtained support material is not solid and is not able to provide mechanical support to the build material. If the content of the polymerization initiator is higher than 10%, the instantaneous concentration of "active centers of polymerization reactions" are over higher once the polymerization initiator is triggered by either thermal or UV light. The reactions between the polymerization initiator and the monomers release a lot of heat, which tends to burn the support material.

For different monomers, the speed of polymerization reactions varies. And for different 3D printing technologies, the speed of printing varies as well. On condition the speed of polymerization reactions is faster than that of printing, a polymerization inhibitor is required. The radical generated by the polymerization inhibitor reacts with polymerization initiator much faster than with monomers. Once the polymerization initiator is triggered by thermal or UV light, within a very short time the concentration of radicals of the polymerization initiator reaches the peak value, which leads to a very short processing time since the polymerization reaction takes place and finishes quickly. The addition of the polymerization inhibitor puts off the coming of the peak value of radical concentration of the polymerization initiator. Therefore, the processing time is extended, which enables the printing.

Preferably, the polymerization inhibitor is selected from 2,2,6,6-tetramethyl-1-piperidinyloxy, butylated hydroxytoluene, mono-tert-butylhydroquinone, tertiary butylhydroquinone, di-tert-butylhydroquinone, p-benzoquinone, o-benzoquinone, nitrobenzene, dinitrochlorobenzene, beta-naphthylamine, ferric chloride, copper chloride, 2,2-diphenyl-2,4,6-trinitrophenylhydrazine, hydroquinone, methyl hydroquinone, tertbutylhydroquinone and 2,5-di-tert-butylhydroquinone, 4-methoxyphenol, p-tert-butylcatechol or a mixture thereof. Preferably, the amount of polymerization inhibitor is from 0.1% to 1% by weight based on the weight of polymerization initiator.

The composition of support material is in liquid status before printing. The term "liquid" means the Dynamic Viscosity of the composition is no more than 10 Pas at 25° C. under 101.325 KPa. The liquid support material requires a proper range of dynamic viscosity to meet two requirements at the same time i.e. first easily flowing out from the nozzles and secondly forming spherical liquid drops after squeezed out from the nozzles. In the present invention, the dynamic viscosity of the composition is from 0.01 Pa·s to 0.1 Pa·s at 25° C. under 101.325 KPa. If the dynamic viscosity is lower than 0.01 Pa·s, the liquid support material tends to spread out after squeezed out from the nozzles. If the dynamic viscosity is higher than 0.1 Pa, the liquid support material tends to be squeezed out from the nozzles uneasily.

The present invention also provides a process of fabricating a three-dimensional object, comprising steps of i) dispensing a build material that comprises a model material composition and a support material composition, and the support material composition comprises the composition of the present invention; ii) curing the layer dispensed in step i); iii) repeating step i) and ii) so as to sequentially form a plurality of layers in a configured pattern corresponding to the shape of the object; and iv) removing the support material from the build material.

In step ii) of the process in the present invention, if the build material is cured by thermal, the polymerization initiator is a redox initiator and the curing of the layer dispensed in step i) is done by heating. Preferably, the temperature of heating is from 25° C. to 100° C. If the build material is cured by UV light the polymerization initiator is a UV light initiator and the curing of the layer dispensed in step i) is done by UV light. Preferably, the UV light has a wavelength of from 300 nanometer to 400 nanometer.

In step iv) of the process in the present invention, the support material is removed by contacting the cured support material with an acidic aqueous solution. Preferably, the said acidic aqueous solution comprises sulphuric acid, acetic acid, hydrochloric acid, nitric acid, trifluoroacetic acid, phosphoric acid, propionic acid, lactic acid, phosphoric acid, glycolic acid, perchloric acid, chloric acid, fluorosilicic acid, permanganic acid, metaphosphoric acid or a mixture thereof.

Compared with prior art technologies, the support material in the present invention does not need to remove by manual first. The acidic aqueous solution is able to completely dissolve the support material without influence on model material. And the speed of dissolving depends on temperature, the concentration of acid and other factors such as stirring. Higher temperature, higher concentration of acid and stirring makes dissolving faster. Here stirring is either manual or mechanical or magnetic stirring.

The present invention also provides a three-dimensional object obtained by the process of the present invention.

Technical Effect

After printing and curing, the support material of the present invention is easily and completely removed from build material by acidic aqueous solution without any manual separation. At the same time, the acidic aqueous solution has no influence on the model material. The disadvantage of manual removing is the force applied to model material is apt to distort the shape or geometry structure of the three-dimensional object especially for precise structures. The support material of the present invention avoids all possible harm to said precise structures.

In the acidic aqueous solution having concentration of 10% by weight, the support material of the present invention is completely dissolved within four hours at 20° C. without stirring. If the temperature is 40° C. and manual stirring is used, the support material is dissolved within 30 minutes in the same acid aqueous solution.

At the same time, the composition of the present invention is easily squeezed out from the nozzles and immediately cured by thermal or UV light. The cured composition has Dynamic Modulus higher than 24 KPa, which is sufficient to support the model material during printing process.

Embodiment

The $1^{st}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth) acrylate, n-octyl (meth)acrylate, n-decyl (meth)acrylate, n-dodecyl (meth)acrylate, 2-hydroxyethyl (meth)acrylate, 2-hydroxypropyl (meth)acrylate, 3-hydroxypropyl (meth) acrylate, 2-methoxyethyl (meth)acrylate, 2-ethoxyethyl (meth)acrylate, 2-ethoxypropyl (meth)acrylate, 3-ethoxypropyl (meth)acrylate, tetrahydrofurfuryl (meth)acrylate, 2-(2-ethoxyethoxy) ethyl acrylate, cyclohexyl (meth)acrylate and isodecyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, calcium cation, aluminum cation and magnesium cation that is provided by ferric (meth)acrylate, calcium (meth)acrylate, aluminum (meth)acrylate, magnesium (meth)acrylate, ferric acetate, calcium acetate, aluminum acetate, magnesium acetate, ferric trifluoroacetate, calcium trifluoroacetate, aluminum trifluoroacetate, magnesium trifluoroacetate, ferric chloride, calcium chloride, aluminium chloride, magnesium chloride, ferric sulfate and aluminium sulfate or a mixture thereof; e) 1% to 10% by weight of redox initiator composed of at least one oxidant agent selected from sodium persulfate, lithium persulfate, potassium persulfate, ferric persulfate, magnesium persulfate, ammonium persulfate and at least one reducing agent selected from sodium sulfite, sodium bisulfite, potassium sulfite, potassium bisulfite, lithium sulfite, lithium bisulfite, ammonium sulfite, ammonium bisulfite, ferrous sulfate, ferrous chloride and the molar ratio of oxidant agent and reducing agent is from 1 to 1.2; f) 20% to 50% by weight of water.

The $2^{nd}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth) acrylate, n-octyl (meth)acrylate, n-decyl (meth)acrylate, n-dodecyl (meth)acrylate, 2-hydroxyethyl (meth)acrylate, 2-hydroxypropyl (meth)acrylate, 3-hydroxypropyl (meth) acrylate, 2-methoxyethyl (meth)acrylate, 2-ethoxyethyl (meth)acrylate, 2-ethoxypropyl (meth)acrylate, 3-ethoxypropyl (meth)acrylate, tetrahydrofurfuryl (meth)acrylate, 2-(2-ethoxyethoxy) ethyl acrylate, cyclohexyl (meth)acrylate and isodecyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, calcium cation, aluminum cation and magnesium cation that is provided by ferric (meth)acrylate, calcium (meth)acrylate, aluminum (meth)acrylate, magnesium (meth)acrylate, ferric acetate, calcium acetate, aluminum acetate, magnesium acetate, ferric trifluoroacetate, calcium trifluoroacetate, aluminum trifluoroacetate, magnesium trifluoroacetate, ferric chloride, calcium chloride, aluminium chloride, magnesium chloride, ferric sulfate and aluminium sulfate or a mixture thereof; e) 1% to 10% by weight of redox initiator composed of at least one oxidant agent selected from sodium persulfate, lithium persulfate, potassium persulfate, ferric persulfate, magnesium persulfate, ammonium persulfate and at least one reducing agent selected from sodium sulfite, sodium bisulfite, potassium sulfite, potassium bisulfite, lithium sulfite, lithium bisulfite, ammonium sulfite, ammonium bisulfite, ferrous sulfate, ferrous chloride and the molar ratio of oxidant agent and reducing agent is from 1 to 1.2; f) 30% to 50% by weight of water.

The 3$^{rd}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from 2-hydroxyethyl(meth) acrylate, 2-hydroxypropyl(meth)acrylate and 3-hydroxypropyl(meth)acrylate, n-butyl(meth)acrylate, 3-ethoxypropyl (meth)acrylate and 2-(2-ethoxyethoxy)ethyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, calcium cation, aluminum cation and magnesium cation that is provided by ferric (meth)acrylate, calcium (meth)acrylate, aluminum (meth)acrylate, magnesium (meth)acrylate, ferric acetate, calcium acetate, aluminum acetate, magnesium acetate, ferric trifluoroacetate, calcium trifluoroacetate, aluminum trifluoroacetate, magnesium trifluoroacetate, ferric chloride, calcium chloride, aluminium chloride, magnesium chloride, ferric sulfate and aluminium sulfate or a mixture thereof; e) 1% to 10% by weight of redox initiator composed of at least one oxidant agent selected from sodium persulfate, lithium persulfate, potassium persulfate, ferric persulfate, magnesium persulfate, ammonium persulfate and at least one reducing agent selected from sodium sulfite, sodium bisulfite, potassium sulfite, potassium bisulfite, lithium sulfite, lithium bisulfite, ammonium sulfite, ammonium bisulfite, ferrous sulfate, ferrous chloride and the molar ratio of oxidant agent and reducing agent is from 1 to 1.2; f) 30% to 50% by weight of water.

The 4$^{th}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2-hydroxypropyl (meth)acrylate, 3-hydroxypropyl (meth)acrylate, 2-methoxyethyl (meth)acrylate, 2-ethoxyethyl (meth)acrylate, 2-ethoxypropyl (meth)acrylate, 3-ethoxypropyl (meth)acrylate, tetrahydrofurfuryl (meth)acrylate, 2-(2-ethoxyethoxy) ethyl acrylate, cyclohexyl (meth)acrylate and isodecyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, aluminum cation and calcium cation that is provided by ferric (meth)acrylate, calcium (meth)acrylate, aluminum (meth)acrylate, ferric acetate, calcium acetate, aluminum acetate, ferric trifluoroacetate, calcium trifluoroacetate, aluminum trifluoroacetate, ferric chloride, calcium chloride, aluminium chloride, ferric sulfate and aluminium sulfate or a mixture thereof; e) 1% to 10% by weight of redox initiator composed of at least one oxidant agent selected from sodium persulfate, lithium persulfate, potassium persulfate, ferric persulfate, magnesium persulfate, ammonium persulfate and at least one reducing agent selected from sodium sulfite, sodium bisulfite, potassium sulfite, potassium bisulfite, lithium sulfite, lithium bisulfite, ammonium sulfite, ammonium bisulfite, ferrous sulfate, ferrous chloride and the molar ratio of oxidant agent and reducing agent is from 1 to 1.2; f) 30% to 50% by weight of water.

The 5$^{th}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2-hydroxypropyl (meth)acrylate, 3-hydroxypropyl (meth)acrylate, 2-methoxyethyl (meth)acrylate, 2-ethoxyethyl (meth)acrylate, 2-ethoxypropyl (meth)acrylate, 3-ethoxypropyl (meth)acrylate, tetrahydrofurfuryl (meth)acrylate, 2-(2-ethoxyethoxy) ethyl acrylate, cyclohexyl (meth)acrylate and isodecyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, calcium cation, aluminum cation and magnesium cation that is provided by ferric (meth)acrylate, calcium (meth)acrylate, aluminum (meth)acrylate, magnesium (meth)acrylate, ferric acetate, calcium acetate, aluminum acetate, magnesium acetate, ferric trifluoroacetate, calcium trifluoroacetate, aluminum trifluoroacetate, magnesium trifluoroacetate, ferric chloride, calcium chloride, aluminium chloride, magnesium chloride, ferric sulfate and aluminium sulfate or a mixture thereof; e) 1% to 10% by weight of redox initiator composed of at least one oxidant agent selected from sodium persulfate, potassium persulfate and at least one reducing agent selected from sodium sulfite, sodium bisulfite, potassium sulfite, potassium bisulfite and the molar ratio of oxidant agent and reducing agent is from 1 to 1.2; f) 30% to 50% by weight of water.

The 6$^{th}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from 2-hydroxyethyl(meth) acrylate, 2-hydroxypropyl(meth)acrylate and 3-hydroxypropyl(meth)acrylate, n-butyl(meth)acrylate, 3-ethoxypropyl (meth)acrylate and 2-(2-ethoxyethoxy)ethyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, aluminum cation and calcium cation that is provided by ferric (meth)acrylate, calcium (meth)acrylate, aluminum (meth)acrylate, ferric acetate, calcium acetate, aluminum acetate, ferric trifluoroacetate, calcium trifluoroacetate, aluminum trifluoroacetate, ferric chloride, calcium chloride, aluminium chloride, ferric sulfate and aluminium sulfate or a mixture thereof; e) 1% to 10% by weight of redox initiator composed of at least one oxidant agent selected from sodium persulfate, lithium persulfate, potassium persulfate, ferric persulfate, magnesium persulfate, ammonium persulfate and at least one reducing agent selected from sodium sulfite, sodium bisulfite, potassium sulfite, potassium bisulfite, lithium sulfite, lithium bisulfite, ammonium sulfite, ammonium bisulfite, ferrous sulfate, ferrous chloride and the molar ratio of oxidant agent and reducing agent is from 1 to 1.2; f) 30% to 50% by weight of water.

The 7$^{th}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from 2-hydroxyethyl(meth)acrylate, 2-hydroxypropyl(meth)acrylate and 3-hydroxypropyl(meth)acrylate, n-butyl(meth)acrylate, 3-ethoxypropyl (meth)acrylate and 2-(2-ethoxyethoxy)ethyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, calcium cation, aluminum cation and magnesium cation that is provided by ferric (meth)acrylate, calcium (meth)acrylate, aluminum (meth)acrylate, magnesium (meth)acrylate, ferric acetate, calcium acetate, aluminum acetate, magnesium acetate, ferric trifluoroacetate, calcium trifluoroacetate, aluminum trifluoroacetate, magnesium trifluoroacetate, ferric chloride, calcium chloride, aluminium chloride, magnesium chloride, ferric sulfate and aluminium sulfate or a mixture thereof; e) 1% to 10% by weight of redox initiator composed of at least one oxidant agent selected from sodium persulfate, potassium persulfate and at least one reducing agent selected from sodium sulfite, sodium bisulfite, potassium sulfite, potassium bisulfite and the molar ratio of oxidant agent and reducing agent is from 1 to 1.2; f) 30% to 50% by weight of water.

The 8$^{th}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2-hydroxypropyl (meth)acrylate, 3-hydroxypropyl (meth)acrylate, 2-methoxyethyl (meth)acrylate, 2-ethoxyethyl (meth)acrylate, 2-ethoxypropyl (meth)acrylate, 3-ethoxypropyl (meth)acrylate, tetrahydrofurfuryl (meth)acrylate, 2-(2-ethoxyethoxy) ethyl acrylate, cyclohexyl (meth)acrylate and isodecyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, aluminum cation and calcium cation that is provided by ferric (meth)acrylate, calcium (meth)acrylate, aluminum (meth)acrylate, ferric acetate, calcium acetate, aluminum acetate, ferric trifluoroacetate, calcium trifluoroacetate, aluminum trifluoroacetate, ferric chloride, calcium chloride, aluminium chloride, ferric sulfate and aluminium sulfate or a mixture thereof; e) 1% to 10% by weight of redox initiator composed of at least one oxidant agent selected from sodium persulfate, potassium persulfate and at least one reducing agent selected from sodium sulfite, sodium bisulfite, potassium sulfite, potassium bisulfite and the molar ratio of oxidant agent and reducing agent is from 1 to 1.2; f) 30% to 50% by weight of water.

The 9$^{th}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from 2-hydroxyethyl(meth)acrylate, 2-hydroxypropyl(meth)acrylate and 3-hydroxypropyl(meth)acrylate, n-butyl(meth)acrylate, 3-ethoxypropyl (meth)acrylate and 2-(2-ethoxyethoxy)ethyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, aluminum cation and calcium cation that is provided by ferric (meth)acrylate, calcium (meth)acrylate, aluminum (meth)acrylate, ferric acetate, calcium acetate, aluminum acetate, ferric trifluoroacetate, calcium trifluoroacetate, aluminum trifluoroacetate, ferric chloride, calcium chloride, aluminium chloride, ferric sulfate and aluminium sulfate or a mixture thereof; e) 1% to 10% by weight of redox initiator composed of at least one oxidant agent selected from sodium persulfate, potassium persulfate and at least one reducing agent selected from sodium sulfite, sodium bisulfite, potassium sulfite, potassium bisulfite and the molar ratio of oxidant agent and reducing agent is from 1 to 1.2; f) 30% to 50% by weight of water.

The 10$^{th}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2-hydroxypropyl (meth)acrylate, 3-hydroxypropyl (meth)acrylate, 2-methoxyethyl (meth)acrylate, 2-ethoxyethyl (meth)acrylate, 2-ethoxypropyl (meth)acrylate, 3-ethoxypropyl (meth)acrylate, tetrahydrofurfuryl (meth)acrylate, 2-(2-ethoxyethoxy) ethyl acrylate, cyclohexyl (meth)acrylate and isodecyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, calcium cation, aluminum cation and magnesium cation that is provided by ferric (meth)acrylate, calcium (meth)acrylate, aluminum (meth)acrylate, magnesium (meth)acrylate, ferric acetate, calcium acetate, aluminum acetate, magnesium acetate, ferric trifluoroacetate, calcium trifluoroacetate, aluminum trifluoroacetate, magnesium trifluoroacetate, ferric chloride, calcium chloride, aluminium chloride, magnesium chloride, ferric sulfate and aluminium sulfate or a mixture thereof; e) 1% to 10% by weight of at least one selected from benzoin methyl ether, benzoin ethyl ether and benzoin isopropyl ether, benzoin phenyl ether and benzoin acetate, acetophenone, 2,2-dimethoxyacetophenone and 1-dichloroacetophenone, benzil dimethyl ketal and benzil diethyl ketal, 2-methylanthraquinone, 2-ethylanthraquinone, 2-tert-butylanthraquinone, 1-chloroanthraquinone and 2-amylanthraquinone, 2,4,6-trimethylbenzoyldiphenylphosphine oxide, benzophenone and 4,4'-bis(N, N'-dimethy-lamino)benzophenone, 1-chloro-4-propoxy-9H-thioxanthen-9-one, 2-chlorothioxanthen-9-one, 2,4-diethyl-9H-thioxanthen-9-one, isopropyl-9H-thioxanthen-9-one, 10-methylphenothiazine, thioxanthen-9-one, 9(10H)-acridanone, 1-phenyl-1, 2-propanedione-2-O-benzoyloxime, 1-aminophenyl ketones, 1-hydroxycyclohexyl phenyl ketone, phenyl-1-hydroxyisopropylketone and 4-isopropylphenyl-1-hydroxyisopropylketone; f) 20% to 50% by weight of water.

The 11$^{th}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2-hydroxypropyl (meth)acrylate, 3-hydroxypropyl (meth)acrylate, 2-methoxyethyl (meth)acrylate, 2-ethoxyethyl (meth)acrylate, 2-ethoxypropyl (meth)acrylate, 3-ethoxypropyl (meth)acrylate, tetrahydrofurfuryl (meth)acrylate, 2-(2-ethoxyethoxy) ethyl acrylate, cyclohexyl (meth)acrylate and isodecyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, calcium cation, aluminum cation and magnesium cation that is provided by ferric (meth)acrylate, calcium (meth)acrylate, aluminum (meth)acrylate, magnesium (meth)acrylate, ferric acetate, calcium acetate, aluminum acetate, magnesium acetate, ferric trifluoroacetate, calcium trifluoroacetate, aluminum trifluoroacetate, magnesium trifluoroacetate, ferric chloride, calcium chloride, aluminium chloride, magnesium chloride, ferric sulfate and aluminium sulfate or a mixture thereof; e) 1% to 10% by weight of at least one selected from benzoin methyl ether, benzoin ethyl ether and benzoin isopropyl ether, benzoin phenyl ether and benzoin acetate, acetophenone, 2,2-dimethoxyacetophenone and 1-dichloroacetophenone, benzil dimethyl ketal and benzil diethyl ketal, 2-methylanthraquinone, 2-ethylanthraquinone, 2-tert-butylanthraquinone, 1-chloroanthraquinone and 2-amylanthraquinone, 2,4,6-trimethylbenzoyldiphenylphosphine oxide, benzophenone and 4,4'-bis(N, N'-dimethy-lamino)benzophenone, 1-chloro-4-propoxy-9H-thioxanthen-9-one, 2-chlorothioxanthen-9-one, 2,4-diethyl-9H-thioxanthen-9-one, isopropyl-9H-thioxanthen-9-one, 10-methylphenothiazine, thioxanthen-9-one, 9(10H)-acridanone, 1-phenyl-1, 2-propanedione-2-O-benzoyloxime, 1-aminophenyl ketones, 1-hydroxycyclohexyl phenyl ketone, phenyl-1-hydroxyisopropylketone and 4-isopropylphenyl-1-hydroxyisopropylketone; f) 20% to 40% by weight of water.

The 12$^{th}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from 2-hydroxydethyl(meth)acrylate, 2-hydroxypropyl(meth)acrylate and 3-hydroxypropyl(meth)acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, calcium cation, aluminum cation and magnesium cation that is provided by ferric (meth)acrylate, calcium (meth)acrylate, aluminum (meth)acrylate, magnesium (meth)acrylate, ferric acetate, calcium acetate, aluminum acetate, magnesium acetate, ferric trifluoroacetate, calcium trifluoroacetate, aluminum trifluoroacetate, magnesium trifluoroacetate, ferric chloride, calcium chloride, aluminium chloride, magnesium chloride, ferric sulfate and aluminium sulfate or a mixture thereof; e) 1% to 10% by weight of at least one selected from benzoin methyl ether, benzoin ethyl ether and benzoin isopropyl ether, benzoin phenyl ether and benzoin acetate, acetophenone, 2,2-dimethoxyacetophenone and 1-dichloroacetophenone, benzil dimethyl ketal and benzil diethyl ketal, 2-methylanthraquinone, 2-ethylanthraquinone, 2-tert-butylanthraquinone, 1-chloroanthraquinone and 2-amylanthraquinone, 2,4,6-trimethylbenzoyldiphenylphosphine oxide, benzophenone and 4,4'-bis(N, N'-dimethylamino)benzophenone, 1-chloro-4-propoxy-9H-thioxanthen-9-one, 2-chlorothioxanthen-9-one, 2,4-diethyl-9H-thioxanthen-9-one, isopropyl-9H-thioxanthen-9-one, 10-methylphenothiazine, thioxanthen-9-one, 9(10H)-acridanone, 1-phenyl-1, 2-propanedione-2-O-benzoyloxime, 1-aminophenyl ketones, 1-hydroxycyclohexyl phenyl ketone, phenyl-1-hydroxyisopropylketone and 4-isopropylphenyl-1-hydroxyisopropylketone; f) 20% to 40% by weight of water.

The 13$^{th}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2-hydroxypropyl (meth)acrylate, 3-hydroxypropyl (meth)acrylate, 2-methoxyethyl (meth)acrylate, 2-ethoxyethyl (meth)acrylate, 2-ethoxypropyl (meth)acrylate, 3-ethoxypropyl (meth)acrylate, tetrahydrofurfuryl (meth)acrylate, 2-(2-ethoxyethoxy) ethyl acrylate, cyclohexyl (meth)acrylate and isodecyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, aluminum cation and calcium cation that is provided by ferric (meth)acrylate, calcium (meth)acrylate, aluminum (meth)acrylate, ferric acetate, calcium acetate, aluminum acetate, ferric trifluoroacetate, calcium trifluoroacetate, aluminum trifluoroacetate, ferric chloride, calcium chloride, aluminium chloride, ferric sulfate and aluminium sulfate or a mixture thereof; e) 1% to 10% by weight of at least one selected from benzoin methyl ether, benzoin ethyl ether and benzoin isopropyl ether, benzoin phenyl ether and benzoin acetate, acetophenone, 2,2-dimethoxyacetophenone and 1-dichloroacetophenone, benzil dimethyl ketal and benzil diethyl ketal, 2-methylanthraquinone, 2-ethylanthraquinone, 2-tert-butylanthraquinone, 1-chloroanthraquinone and 2-amylanthraquinone, 2,4,6-trimethylbenzoyldiphenylphosphine oxide, benzophenone and 4,4'-bis(N, N'-dimethylamino)benzophenone, 1-chloro-4-propoxy-9H-thioxanthen-9-one, 2-chlorothioxanthen-9-one, 2,4-diethyl-9H-thioxanthen-9-one, isopropyl-9H-thioxanthen-9-one, 10-methylphenothiazine, thioxanthen-9-one, 9(10H)-acridanone, 1-phenyl-1, 2-propanedione-2-O-benzoyloxime, 1-aminophenyl ketones, 1-hydroxycyclohexyl phenyl ketone, phenyl-1-hydroxyisopropylketone and 4-isopropylphenyl-1-hydroxyisopropylketone; f) 20% to 40% by weight of water.

The 14$^{th}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2-hydroxypropyl (meth)acrylate, 3-hydroxypropyl (meth)acrylate, 2-methoxyethyl (meth)acrylate, 2-ethoxyethyl (meth)acrylate, 2-ethoxypropyl (meth)acrylate, 3-ethoxypropyl (meth)acrylate, tetrahydrofurfuryl (meth)acrylate, 2-(2-ethoxyethoxy) ethyl acrylate, cyclohexyl (meth)acrylate and isodecyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, calcium cation, aluminum cation and magnesium cation that is provided by ferric (meth)acrylate, calcium (meth)acrylate, aluminum (meth)acrylate, magnesium (meth)acrylate, ferric acetate, calcium acetate, aluminum acetate, magnesium acetate, ferric trifluoroacetate, calcium trifluoroacetate, aluminum trifluoroacetate, magnesium trifluoroacetate, ferric chloride, calcium chloride, aluminium chloride, magnesium chloride, ferric sulfate and aluminium sulfate or a mixture thereof; e) 1% to 10% by weight of at least one selected from bis-(2,4,6-trimethylbenzoyl)-phenyl phosphineoxide, benzoin methyl ether, 2,2'-dimethoxyacetophenone, 2-ethylanthraquinone, 10-methyl phenothiazine and 1:1(molar ratio) mixture of benzophenone and 1-hydroxy-cyclohexylphenylketone; f) 20% to 40% by weight of water.

The 15$^{th}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from 2-hydroxyethyl(meth)acrylate, 2-hydroxypropyl(meth)acrylate and 3-hydroxypropyl(meth)acrylate, n-butyl(meth)acrylate, 3-ethoxypropyl (meth)acrylate and 2-(2-ethoxyethoxy)ethyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, aluminum cation and calcium cation that is provided by ferric (meth)acrylate, calcium (meth)acrylate, aluminum (meth)acrylate, ferric acetate, calcium acetate, aluminum acetate, ferric trifluoroacetate, calcium trifluoroacetate, aluminum trifluoroacetate, ferric chloride, calcium chloride, aluminium chloride, ferric sulfate and aluminium sulfate or a mixture thereof; e) 1% to 10% by weight of at least one selected from benzoin methyl ether, benzoin ethyl ether and benzoin isopropyl ether, benzoin phenyl ether and benzoin acetate, acetophenone, 2,2-dimethoxyacetophenone and 1-dichloroacetophenone, benzil dimethyl ketal and benzil diethyl ketal, 2-methylanthraquinone, 2-ethylanthraquinone, 2-tert-butylanthraquinone, 1-chloroanthraquinone and 2-amylanthraquinone, 2,4,6-trimethylbenzoyldiphenylphosphine oxide, benzophenone and 4,4'-bis(N, N'-dimethy-lamino)benzophenone, 1-chloro-4-propoxy-9H-thioxanthen-9-one, 2-chlorothioxanthen-9-one, 2,4-diethyl-9H-thioxanthen-9-one, isopropyl-9H-thioxanthen-9-one, 10-methylphenothiazine, thioxanthen-9-one, 9(10H)-acridanone, 1-phenyl-1, 2-propanedione-2-O-benzoyloxime, 1-aminophenyl ketones, 1-hydroxycyclohexyl phenyl ketone, phenyl-1-hydroxyisopropylketone and 4-isopropylphenyl-1-hydroxyisopropylketone; f) 20% to 40% by weight of water.

The 16$^{th}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from 2-hydoxyethyl(meth)acrylate, 2-hydroxypropyl(meth)acrylate and 3-hydroxypropyl(meth)acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, calcium cation, aluminum cation and magnesium cation that is provided by ferric (meth)acrylate, calcium (meth)acrylate, aluminum (meth)acrylate, magnesium (meth)acrylate, ferric acetate, calcium acetate, aluminum acetate, magnesium acetate, ferric trifluoroacetate, calcium trifluoroacetate, aluminum trifluoroacetate, magnesium trifluoroacetate, ferric chloride, calcium chloride, aluminium chloride, magnesium chloride, ferric sulfate and aluminium sulfate or a mixture thereof; e) 1% to 10% by weight of at least one selected from bis(2,4,6-trimethylbenzoyl)-phenyl phosphineoxide, benzoin methyl ether, 2,2'-dimethoxyacetophenone, 2-ethylanthraquinone, 10-methyl phenothiazine and 1:1(molar ratio) mixture of benzophenone and 1-hydroxy-cyclohexylphenylketone; f) 20% to 40% by weight of water.

The 17$^{th}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2-hydroxypropyl (meth)acrylate, 3-hydroxypropyl (meth)acrylate, 2-methoxyethyl (meth)acrylate, 2-ethoxyethyl (meth)acrylate, 2-ethoxypropyl (meth)acrylate, 3-ethoxypropyl (meth)acrylate, tetrahydrofurfuryl (meth)acrylate, 2-(2-ethoxyethoxy) ethyl acrylate, cyclohexyl (meth)acrylate and isodecyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, aluminum cation and calcium cation that is provided by ferric (meth)acrylate, calcium (meth)acrylate, aluminum (meth)acrylate, ferric acetate, calcium acetate, aluminum acetate, ferric trifluoroacetate, calcium trifluoroacetate, aluminum trifluoroacetate, ferric chloride, calcium chloride, aluminium chloride, ferric sulfate and aluminium sulfate or a mixture thereof; e) 1% to 10% by weight of at least one selected from bis-(2,4,6-trimethylbenzoyl)-phenyl phosphineoxide, benzoin methyl ether, 2,2'-dimethoxyacetophenone, 2-ethylanthraquinone, 10-methyl phenothiazine and 1:1(molar ratio) mixture of benzophenone and 1-hydroxy-cyclohexylphenylketone; f) 20% to 40% by weight of water.

The 18$^{th}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from 2-hydroxyethyl(meth)acrylate, 2-hydroxypropyl(meth)acrylate and 3-hydroxypropyl(meth)acrylate, n-butyl(meth)acrylate, 3-ethoxypropyl (meth)acrylate and 2-(2-ethoxyethoxy)ethyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 5% by weight of at least one selected from ferric cation, aluminum cation and calcium cation that is provided by ferric (meth)acrylate, calcium (meth)acrylate, aluminum (meth)acrylate, ferric acetate, calcium acetate, aluminum acetate, ferric trifluoroacetate, calcium trifluoroacetate, aluminum trifluoroacetate, ferric chloride, calcium chloride, aluminium chloride, ferric sulfate and aluminium sulfate or a mixture thereof; e) 2% to 10% by weight of at least one selected from bis-(2,4,6-trimethylbenzoyl)-phenyl phosphineoxide, benzoin methyl ether, 2,2'-dimethoxyacetophenone, 2-ethylanthraquinone, 10-methyl phenothiazine and 1:1(molar ratio) mixture of benzophenone and 1-hydroxy-cyclohexylphenylketone; f) 20% to 40% by weight of water.

The 19$^{th}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth) acrylate, n-octyl (meth)acrylate, n-decyl (meth)acrylate, n-dodecyl (meth)acrylate, 2-hydroxyethyl (meth)acrylate, 2-hydroxypropyl (meth)acrylate, 3-hydroxypropyl (meth) acrylate, 2-methoxyethyl (meth)acrylate, 2-ethoxyethyl (meth)acrylate, 2-ethoxypropyl (meth)acrylate, 3-ethoxypropyl (meth)acrylate, tetrahydrofurfuryl (meth)acrylate, 2-(2-ethoxyethoxy) ethyl acrylate, cyclohexyl (meth)acrylate and isodecyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, calcium cation, aluminum cation and magnesium cation that is provided by ferric (meth)acrylate, calcium (meth)acrylate, aluminum (meth)acrylate, magnesium (meth)acrylate, ferric acetate, calcium acetate, aluminum acetate, magnesium acetate, ferric trifluoroacetate, calcium trifluoroacetate, aluminum trifluoroacetate, magnesium trifluoroacetate, ferric chloride, calcium chloride, aluminium chloride, magnesium chloride, ferric sulfate and aluminium sulfate or a mixture thereof; e) 1% to 10% by weight of redox initiator composed of at least one oxidant agent selected from sodium persulfate, lithium persulfate, potassium persulfate, ferric persulfate, magnesium persulfate, ammonium persulfate and at least one reducing agent selected from sodium sulfite, sodium bisulfite, potassium sulfite, potassium bisulfite, lithium sulfite, lithium bisulfite, ammonium sulfite, ammonium bisulfite, ferrous sulfate, ferrous chloride and the molar ratio of oxidant agent and reducing agent is from 1 to 1.2; f) 20% to 50% by weight of water and polymerization inhibitor selected from 2,2,6,6-tetramethyl-1-piperidinyloxy, butylated hydroxytoluene, mono-tert-butylhydroquinone, tertiary butylhydroquinone, di-tert-butylhydroquinone, p-benzoquinone, o-benzoquinone, nitrobenzene, dinitrochlorobenzene, beta-naphthylamine, ferric chloride, copper chloride, 2,2-diphenyl-2,4,6-trinitrophenylhydrazine, hydroquinone, methyl hydroquinone, tertbutylhydroquinone, 2,5-di-tert-butylhydroquinone, 4-methoxyphenol and p-tert-butylcatechol or a mixture thereof. The amount of polymerization inhibitor is from 0.1% to 1% by weight based on the weight of polymerization initiator.

The 20$^{th}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth) acrylate, n-octyl (meth)acrylate, n-decyl (meth)acrylate, n-dodecyl (meth)acrylate, 2-hydroxyethyl (meth)acrylate, 2-hydroxypropyl (meth)acrylate, 3-hydroxypropyl (meth) acrylate, 2-methoxyethyl (meth)acrylate, 2-ethoxyethyl (meth)acrylate, 2-ethoxypropyl (meth)acrylate, 3-ethoxypropyl (meth)acrylate, tetrahydrofurfuryl (meth)acrylate, 2-(2-ethoxyethoxy) ethyl acrylate, cyclohexyl (meth)acrylate and isodecyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, calcium cation, aluminum cation and magnesium cation that is provided by ferric (meth)acrylate, calcium (meth)acrylate, aluminum (meth)acrylate, magnesium (meth)acrylate, ferric acetate, calcium acetate, aluminum acetate, magnesium acetate, ferric trifluoroacetate, calcium trifluoroacetate, aluminum trifluoroacetate, magnesium trifluoroacetate, ferric chloride, calcium chloride, aluminium chloride, magnesium chloride, ferric sulfate and aluminium sulfate or a mixture thereof; e) 1% to 10% by weight of at least one selected from benzoin methyl ether, benzoin ethyl ether and benzoin isopropyl ether, benzoin phenyl ether and benzoin acetate, acetophenone, 2,2-dimethoxyacetophenone and 1-dichloroacetophenone, benzil dimethyl ketal and benzil diethyl ketal, 2-methylanthraquinone, 2-ethylanthraquinone, 2-tert-butylanthraquinone, 1-chloroanthraquinone and 2-amylanthraquinone, 2,4,6-trimethylbenzoyldiphenylphosphine oxide, benzophenone and 4,4'-bis(N, N'-dimethy-lamino)benzophenone, 1-chloro-4-propoxy-9H-thioxanthen-9-one, 2-chlorothioxanthen-9-one, 2,4-diethyl-9H-thioxanthen-9-one, isopropyl-9H-thioxanthen-9-one, 10-methylphenothiazine, thioxanthen-9-one, 9(10H)-acridanone, 1-phenyl-1, 2-propanedione-2-O-benzoyloxime, 1-aminophenyl ketones, 1-hydroxycyclohexyl phenyl ketone, phenyl-1-hydroxyisopropylketone and 4-isopropylphenyl-1-hydroxyisopropylketone; f) 20% to 50% by weight of water and polymerization inhibitor selected from 2,2,6,6-tetramethyl-1-piperidinyloxy, butylated hydroxytoluene, mono-tert-butylhydroquinone, tertiary butylhydroquinone, di-tert-butylhydroquinone, p-benzoquinone, o-benzoquinone, nitrobenzene, dinitrochlorobenzene, beta-naphthylamine, ferric chloride, copper chloride, 2,2-diphenyl-2,4,6-trinitrophenylhydrazine, hydroquinone, methyl hydroquinone, tertbutylhydroquinone, 2,5-di-tert-butylhydroquinone, 4-methoxyphenol and p-tert-butylcatechol or a mixture thereof. The amount of polymerization inhibitor is from 0.1% to 1% by weight based on the weight of polymerization initiator.

The 21$^{st}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from 2-hydroxyethyl(meth) acrylate, 2-hydroxypropyl(meth)acrylate and 3-hydroxypropyl(meth)acrylate, n-butyl(meth)acrylate, 3-ethoxypropyl (meth)acrylate and 2-(2-ethoxyethoxy)ethyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, aluminum cation and calcium cation that is provided by ferric (meth)acrylate, calcium (meth)acrylate, aluminum (meth)acrylate, ferric acetate, calcium acetate, aluminum acetate, ferric trifluoroacetate, calcium trifluoroacetate, aluminum trifluoroacetate, ferric chloride, calcium chloride, aluminium chloride, ferric sulfate and aluminium sulfate or a mixture thereof; e) 1% to 10% by weight of redox initiator composed of at least one oxidant agent selected from sodium persulfate, potassium persulfate and at least one reducing agent selected from sodium sulfite, sodium bisulfite, potassium sulfite, potassium bisulfite and the molar ratio of oxidant agent and reducing agent is from 1 to 1.2; f) 30% to 50% by weight of water and polymerization inhibitor selected from 2,2,6,6-tetramethyl-1-piperidinyloxy, butylated hydroxytoluene, mono-tert-butylhydroquinone, tertiary butylhydroquinone, di-tert-butylhydroquinone, p-benzoquinone, o-benzoquinone, nitrobenzene, dinitrochlorobenzene, beta-naphthylamine, ferric chloride, copper chloride, 2,2-diphenyl-2,4,6-trinitrophenylhydrazine, hydroquinone, methyl hydroquinone, tertbutylhydroquinone, 2,5-di-tert-butylhydroquinone, 4-methoxyphenol and p-tert-butylcatechol or a mixture thereof. The amount of polymerization inhibitor is from 0.1% to 1% by weight based on the weight of polymerization initiator.

The 22$^{nd}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from 2-hydroxyethyl (meth)acrylate, 2-hydroxypropyl(meth)acrylate and 3-hydroxyproply(meth)acrylate, n-butyl(meth)acrylate, 3-ethoxypropyl(meth)acrylate and 2-(2-ethoxyethoxy)ethyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 5% by weight of at least one selected from ferric cation, aluminum cation and calcium cation that is provided by ferric (meth)acrylate, calcium (meth)acrylate, aluminum (meth)acrylate, ferric acetate, calcium acetate, aluminum acetate, ferric trifluoroacetate, calcium trifluoroacetate, aluminum trifluoroacetate, ferric chloride, calcium chloride, aluminium chloride, ferric sulfate and aluminium sulfate or a mixture thereof; e) 2% to 10% by weight of at least one selected from bis-(2,4,6-trimethylbenzoyl)-phenyl phosphineoxide, benzoin methyl ether, 2,2'-dimethoxyacetophenone, 2-ethylanthraquinone, 10-methyl phenothiazine and 1:1(molar ratio) mixture of benzophenone and 1-hydroxy-cyclohexylphenylketone; f) 20% to 40% by weight of water and polymerization inhibitor selected from 2,2,6,6-tetramethyl-1-piperidinyloxy, butylated hydroxytoluene, mono-tert-butylhydroquinone, tertiary butylhydroquinone, di-tert-butylhydroquinone, p-benzoquinone, o-benzoquinone, nitrobenzene, dinitrochlorobenzene, beta-naphthylamine, ferric chloride, copper chloride, 2,2-diphenyl-2,4,6-trinitrophenylhydrazine, hydroquinone, methyl hydroquinone, tertbutylhydroquinone, 2,5-di-tert-butylhydroquinone, 4-methoxyphenol and p-tert-butylcatechol or a mixture thereof. The amount of polymerization inhibitor is from 0.1% to 1% by weight based on the weight of polymerization initiator.

The 23$^{rd}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from 2-hydroxyethyl(meth)acrylate, 2-hydroxypropyl(meth)acrylate and 3-hydroxypropyl(meth)acrylate, n-butyl(meth)acrylate, 3-ethoxypropyl(meth)acrylate and 2-(2-ethoxyethoxy)ethyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 10% by weight of at least one selected from ferric cation, aluminum cation and calcium cation that is provided by ferric (meth)acrylate, calcium (meth)acrylate, aluminum (meth)acrylate, ferric acetate, calcium acetate, aluminum acetate, ferric trifluoroacetate, calcium trifluoroacetate, aluminum trifluoroacetate, ferric chloride, calcium chloride, aluminium chloride, ferric sulfate and aluminium sulfate or a mixture thereof; e) 1% to 10% by weight of redox initiator composed of at least one oxidant agent selected from sodium persulfate, potassium persulfate and at least one reducing agent selected from sodium sulfite, sodium bisulfite, potassium sulfite, potassium bisulfite and the molar ratio of oxidant agent and reducing agent is from 1 to 1.2; f) 30% to 50% by weight of water and polymerization inhibitor selected from hydroquinone, methyl hydroquinone, tertbutylhydroquinone, 2,5-di-tert-butylhydroquinone, 4-methoxyphenol and p-tert-butylcatechol or a mixture thereof. The amount of polymerization inhibitor is from 0.1% to 1% by weight based on the weight of polymerization initiator.

The 24$^{th}$ embodiment is a composition comprising a) 10% to 30% by weight of at least one selected from acrylic acid, methacrylic acid, crotonic acid, maleic acid, allylacetic acid, 3-butenoic acid and 2-heptenoic acid; b) 10% to 30% by weight of at least one selected from 2-hydroxyethyl(meth)acrylate, 2-hydroxypropyl(meth)acrylate and 3-hydroxyproply(meth)acrylate, n-butyl(meth)acrylate, 3-ethoxypropyl(meth)acrylate and 2-(2-ethoxyethoxy)ethyl acrylate; c) 5% to 15% by weight of at least one selected from sodium acrylate, potassium acrylate, lithium acrylate, pentenoic acid sodium, crotonic acid sodium, 2-butenedioic acid disodium salt and potassium crotonate; d) 0.5% to 5% by weight of at least one selected from ferric cation, aluminum cation and calcium cation that is provided by ferric (meth)acrylate, calcium (meth)acrylate, aluminum (meth)acrylate, ferric acetate, calcium acetate, aluminum acetate, ferric trifluoroacetate, calcium trifluoroacetate, aluminum trifluoroacetate, ferric chloride, calcium chloride, aluminium chloride, ferric sulfate and aluminium sulfate or a mixture thereof; e) 2% to 10% by weight of at least one selected from bis-(2,4,6-trimethylbenzoyl)-phenyl phosphineoxide, benzoin methyl ether, 2,2'-dimethoxyacetophenone, 2-ethylanthraquinone, 10-methyl phenothiazine and 1:1(molar ratio) mixture of benzophenone and 1-hydroxy-cyclohexylphenylketone; f) 20% to 40% by weight of water and polymerization inhibitor selected from hydroquinone, methyl hydroquinone, tert-butylhydroquinone, 2,5-di-tert-butylhydroquinone, 4-methoxyphenol and p-tert-butylcatechol or a mixture thereof. The amount of polymerization inhibitor is from 0.1% to 1% by weight based on the weight of polymerization initiator.

EXAMPLE

Below examples show how to prepare the composition of present invention and the Dynamic Viscosity test is carried out for composition before printing, Dynamic Modulus test are carried out for composition after curing and the dissolving test is carried out for support material obtained from the composition. These examples are used to illustrate the embodiment of present invention without any limitation on the protection scope of Claims.

Example 1

The composition is prepared by mixing below components:

| Chemical Compound | Weight Percentage (%) | Product Name |
|---|---|---|
| Acrylic acid | 25.08 | 147230 Sigma-Aldrich |
| 2-hydroxyethyl (meth)acrylate | 15.68 | M0085 TCI |
| Sodium acrylate | 10.45 | 408220 Sigma-Aldrich |
| Ferric chloride | 4.49 | 157740 Sigma-Aldrich |
| Potassium persulfate | 1.25 | 10017418 Sinopharm |
| Sodium sulfite | 0.56 | 10020718 Sinopharm |
| Water | 42.48 | |

Example 2

The composition is prepared by mixing below components:

| Chemical Compound | Weight Percentage (%) | Product Name |
|---|---|---|
| Acrylic acid | 27.06 | 147230 Sigma-Aldrich |
| 3-hydroxypropyl (meth)acrylate | 10.02 | 268542 Sigma-Aldrich |
| Sodium acrylate | 10.02 | 408220 Sigma-Aldrich |
| Ferric chloride | 0.64 | 157740 Sigma-Aldrich |
| Aluminum acetate | 5.51 | 1012291 Xiya reagent |
| Ammonium persulfate | 1.10 | 10002616 Sinopharm |
| Sodium sulfite | 0.54 | 10020718 Sinopharm |
| p-tert-butylcatechol | 0.01 | B0739 TCI |
| water | 45.09 | |

Example 3

The composition is prepared by mixing below components:

| Chemical Compound | Weight Percentage (%) | Product Name |
|---|---|---|
| 3-butenoic acid | 23.91 | 134716 Sigma-Aldrich |
| 3-hydroxypropyl (meth)acrylate | 8.86 | 268542 Sigma-Aldrich |
| 2-ethoxyethyl(meth)acrylate | 8.86 | 280666 Sigma-Aldrich |
| Potassium acrylate | 10.62 | L10079 Alfa Aesar |
| Ferric chloride | 0.57 | 157740 Sigma-Aldrich |
| Aluminum acetate | 5.76 | 1012291 Xiya reagent |
| Sodium persulfate | 1.06 | 80118417 Sinopharm |
| Sodium sulfite | 0.47 | 10020718 Sinopharm |
| p-tert-butylcatechol | 0.01 | B0739 TCI |
| water | 39.86 | |

Example 4

The composition is prepared by mixing below components:

| Chemical Compound | Weight Percentage (%) | Product Name |
|---|---|---|
| Acrylic acid | 29.39 | 147230 Sigma-Aldrich |
| 2-hydroxyethyl (meth)acrylate | 9.18 | M0085 TCI |
| Sodium acrylate | 9.18 | 408220 Sigma-Aldrich |
| Ferric chloride | 0.59 | 157740 Sigma-Aldrich |
| Aluminum acetate | 9.18 | 1012291 Xiya reagent |
| Bis(2,4,6-trimethylbenzoyl)-phenylphosphineoxide | 0.37 | |
| 1:1(molar ratio) mixture of benzophenone and 1-hydroxy-cyclohexylphenylketone | 0.75 | |
| 4-methoxyphenol | 0.01 | 54050 Sigma-Aldrich |
| water | 41.33 | |

Example 5

The composition is prepared by mixing below components:

| Chemical Compound | Weight Percentage (%) | Product Name |
|---|---|---|
| Acrylic acid | 29.82 | 408220 Sigma-Aldrich |
| 2-hydroethyl (meth)acrylate | 10.84 | M0085 TCI |
| Sodium acrylate | 10.84 | 408220 Sigma-Aldrich |
| Ferric chloride | 0.69 | 157740 Sigma-Aldrich |
| Aluminum acetate | 7.15 | 1012291 Xiya reagent |
| Bis(2,4,6-trimethylbenzoyl)-phenylphosphineoxide | 0.89 | |
| 1:1(molar ratio) mixture of benzophenone and 1-hydroxy-cyclohexylphenylketone | 1.78 | |
| hydroquinone | 0.01 | H0186 TCI |
| water | 37.96 | |

Example 6

The composition is prepared by mixing below components:

| Chemical Compound | Weight Percentage (%) | Product Name |
|---|---|---|
| Methacrylic acid | 29.17 | M0079 TCI |
| 2-(2-ethoxyethoxy)ethyl acrylate | 10.84 | E0652 TCI |
| Lithium acrylate | 10.80 | GEL-CXLI015 Meryer |
| Ferric chloride | 0.70 | 157740 Sigma-Aldrich |
| Aluminum acetate | 8.64 | 1012291 Xiya reagent |
| Benzoin methyl ether | 0.32 | B0869 TCI |
| 1:1(molar ratio) mixture of benzophenone and 1-hydroxy-cyclohexylphenylketone | 1.73 | |
| hydroquinone | 0.01 | H0186 TCI |
| water | 37.81 | |

Example 7

The composition is prepared by mixing below components:

| Chemical Compound | Weight Percentage (%) | Product Name |
|---|---|---|
| Crotonic acid | 27.88 | 113018 Sigma-Aldrich |
| 2-(2-ethoxyethoxy)ethyl acrylate | 11.15 | E0652 TCI |
| Potassium crotonate | 11.15 | C-49183 Carbone SCIENTIFIC |
| Ferric chloride | 0.72 | 157740 Sigma-Aldrich |
| Calcium chloride | 7.80 | 10005817 Sinopharm |
| benzildimethlketal | 13.25 | |
| Hydroquinone | 0.01 | H0186 TCI |
| water | 39.04 | |

Example 8

The composition is prepared by mixing below components:

| Chemical Compound | Weight Percentage (%) | Product Name |
|---|---|---|
| Maleic acid | 16.53 | M0006 TCI |
| 2-(2-ethoxyethoxy)ethyl acrylate | 28.36 | E0652 TCI |
| Lithium acrylate | 6.62 | GEL-CXLI015 Meryer |
| Magnesium chloride | 3.65 | M8266 Sigma Aldrich |
| 2-ethylanthraquinone | 9.09 | E12206 Sigma Aldrich |
| water | 35.75 | |

Example 9

The composition is prepared by mixing below components:

| Chemical Compound | Weight Percentage (%) | Product Name |
|---|---|---|
| Allylacetic acid | 25.15 | 245925 Sigma-Aldrich |
| n-butyl (meth)acrylate | 22.13 | 235865 Sigma-Aldrich |
| Potassium acrylate | 10.06 | L10079 Alfa Aesar |
| Magnesium chloride | 5.03 | M8266 Sigma-Aldrich |
| Ferric chloride | 0.4 | 157740 Sigma-Aldrich |
| 10-methylphenothiazine | 2.01 | 425346 Sigma-Aldrich |
| 2,5-di-tert-butylhydroquinone | 0.01 | 112976 Sigma-Aldrich |
| water | 35.21 | |

Example 10

The composition is prepared by mixing below components:

| Chemical Compound | Weight Percentage (%) | Product Name |
|---|---|---|
| Acrylic acid | 12.82 | 147230 Sigma-Aldrich |
| 3-hydroxypropyl(meth)acrylate | 25.84 | 268542 Sigma-Aldrich |
| Sodium acrylate | 10.84 | 408220 Sigma-Aldrich |
| Ferric chloride | 1.7 | 157740 Sigma-Aldrich |
| Aluminum acetate | 6.15 | 1012291 Xiya reagent |
| bis(2,4,6-trimethylbenzoyl)-phenylphosphineoxide | 3.85 | |
| 1:1(molar ratio) mixture of benzophenone and 1-hydroxy-cyclohexylphenylketone | 1.82 | |
| water | 36.98 | |

Example 11

The composition is prepared by mixing below components:

| Chemical Compound | Weight Percentage (%) | Product Name |
|---|---|---|
| Acrylic acid | 21.85 | 147230 Sigma-Aldrich |
| 2-hydroxyethyl (meth)acrylate | 28.84 | M0085 TCI |
| Sodium acrylate | 14.84 | 408220 Sigma-Aldrich |
| Aluminum acetate | 9.84 | 1012291 Xiya reagent |
| 1:1(molar ratio) mixture of benzophenone and 1-hydroxy-cyclohexylphenylketone | 2.67 | |
| water | 21.96 | |

Example 12

The composition is prepared by mixing below components:

| Chemical Compound | Weight Percentage (%) | Product Name |
|---|---|---|
| Methacrylic acid | 25.08 | M0079 TCI |
| 2-hydroxyethyl (meth)acrylate | 15.57 | M0085 TCI |
| Lithium acrylate | 14.45 | GEL-CXLI015 Meryer |
| Ferric chloride | 0.6 | 157740 Sigma-Aldrich |
| benzildimethylketal | 8.82 | |
| water | 35.48 | |

Example 13

The composition is prepared by mixing below components:

| Chemical Compound | Weight Percentage (%) | Product Name |
|---|---|---|
| Acrylic acid | 25.08 | 147230 Sigma-Aldrich |
| 2-(2-ethoxyethoxy)ethyl acrylate | 25.57 | E0652 TCI |
| Potassium acrylate | 6.45 | L10079 Alfa Aesar |
| Magnesium chloride | 6.62 | M8266 Sigma-Aldrich |
| Ferric chloride | 1.63 | 157740 Sigma-Aldrich |
| benzildimethylketal | 6.82 | |
| 1:1(molar ratio) mixture of benzophenone and 1-hydroxy-cyclohexylphenylketone | 2.12 | |
| water | 25.71 | |

A dynamic viscosity test of compositions obtained from Examples 1 to 13 are carried out using the equipment Anton Paar MCR 302 at 25° C. under 101.325 KPa. The rotor is concentric cylinder and the shear rate is 300 s$^{-1}$. The test results of Dynamic Viscosity are summarized in Table 1.

The model material methy methacrylate and the composition obtained from Examples 1 to 3 are printed out from two independent nozzles and cured by UV light and thermal respectively. The cured composition of Examples 1 to 3 is marked as Samples #1 to #3.

The model material methyl methacrylate and the composition obtained from Examples 4 to 13 are printed out from two independent nozzles and both cured by UV light. The cured composition of Examples 4 to 13 is marked as Sample #4 to #13.

A dynamic modulus test of Samples #1 to #13 are carried out using the equipment Anton Paar MCR 302 at 25° C. under 101.325 KPa. The rotor is flat plate and the oscillation mode is chosen with angular frequency of 10 rad/s and strain changes from 0.01% to 1%. The test results of Dynamic Modulus are summarized in Table 1.

Samples #1 to #13 are dissolved in H$_2$SO$_4$ aqueous solution having concentration of 10% by weight at 20° C. and 40° C. respectively with and without manual stirring. The dissolving time of each sample is recorded. The results are summarized in Table 1.

Samples #1 to #13 are dissolved in HCl aqueous solution having concentration of 10% by weight at 20° C. and 40° C. respectively with and without manual stirring. The dissolving time of each sample is recorded. The results are summarized in Table 1.

Samples #1 to #13 are dissolved in acetic acid aqueous solution having concentration of 10% by weight at 20° C. and 40° C. respectively with and without manual stirring. The dissolving time of each sample is recorded. The results are summarized in Table 1.

As shown in Table 1, the dynamic viscosity of the composition of Examples 1 to 13 is from 29 to 39 mPa·s at 25° C., which enables smooth flowing from the nozzles of the printers. After curing, the samples 1 to 13 are obtained and the dynamic modulus of these samples is from 24.6 to 39.9 KPa at 25° C., which provides sufficient mechanical strength to support the build material.

Samples 1 to 13 are dissolved in acid aqueous solution of H$_2$SO$_4$ having the concentration of 10% by weight at 20° C. and 40° C. and with or without stirring respectively. The similar treatments are done for Samples 1 to 13 in HCl solution having the concentration of 10% by weight and acetic acid having the same concentration. The samples are completely dissolved in the acid aqueous solution within 70 minutes. And if the temperature is 40° C. and stirring is used, the time for completely dissolving is less than 10 minutes.

The invention claimed is:

1. A composition comprising:
 a) 10% to 30% by weight of at least one monomer of Formula I:

Formula I wherein R$_1$ is a C$_2$-C$_8$ alkenyl group with or without substitution of a carboxyl group;

TABLE 1

| Example | | 1 | 2 | 3 | 4 | 5 | 6 | 7 | 8 | 9 | 10 | 11 | 12 | 13 |
|---|---|---|---|---|---|---|---|---|---|---|---|---|---|---|
| Dynamic viscosity (mPa·s) at 25° C. | | 33 | 36 | 33 | 31 | 28 | 29 | 39 | 31 | 37 | 31 | 36 | 29 | 38 |
| Sample | | #1 | #2 | #3 | #4 | #5 | #6 | #7 | #8 | #9 | #10 | #11 | #12 | #13 |
| Dynamic Modulus (KPa) at 25° C. | | 32.7 | 34.3 | 29.8 | 38.1 | 39.0 | 31.8 | 39.9 | 24.6 | 32.3 | 36.7 | 32.3 | 25.5 | 27.8 |
| Dissolving time in 10% H$_2$SO$_4$ at 20° C. (min) | With stirring | 20 | 20 | 34 | 18 | 25 | 27 | 37 | 40 | 33 | 30 | 28 | 36 | 30 |
| | Without stirring | 40 | 40 | 50 | 30 | 50 | 45 | 55 | 65 | 57 | 55 | 48 | 54 | 58 |
| Dissolving time in 10% H$_2$SO$_4$ at 40° C. (min) | With stirring | 10 | 10 | 15 | 9 | 10 | 12 | 20 | 25 | 19 | 22 | 22 | 23 | 21 |
| | Without stirring | 25 | 22 | 27 | 20 | 25 | 26 | 35 | 43 | 35 | 32 | 36 | 48 | 51 |
| Dissolving time in 10% HCl at 20° C. (min) | With stirring | 20 | 20 | 33 | 16 | 26 | 25 | 35 | 39 | 30 | 31 | 29 | 37 | 32 |
| | Without stirring | 45 | 40 | 50 | 30 | 50 | 46 | 57 | 67 | 52 | 56 | 51 | 57 | 55 |
| Dissolving time in 10% HCl at 40° C. (min) | With stirring | 12 | 10 | 15 | 10 | 10 | 11 | 20 | 25 | 20 | 24 | 25 | 25 | 26 |
| | Without stirring | 26 | 20 | 25 | 20 | 27 | 25 | 32 | 40 | 37 | 47 | 49 | 49 | 45 |
| Dissolving time in 10% acetic acid at 20° C. (min) | With stirring | 23 | 18 | 30 | 15 | 25 | 25 | 32 | 37 | 36 | 33 | 31 | 35 | 33 |
| | Without stirring | 46 | 40 | 45 | 25 | 50 | 43 | 50 | 65 | 55 | 58 | 55 | 55 | 52 |
| Dissolving time in 10% acetic acid at 40° C. (min) | With stirring | 16 | 10 | 13 | 7 | 10 | 12 | 19 | 27 | 20 | 26 | 25 | 27 | 27 |
| | Without stirring | 30 | 17 | 24 | 15 | 23 | 25 | 30 | 39 | 40 | 49 | 49 | 51 | 50 | b) 10% to 30% by weight of at least one monomer of Formula II:

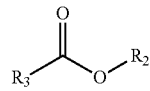

Formula II wherein $R_2$ is a $C_1$-$C_{18}$ alkyl group with or without substitution of a hydroxy group, a 2-(2-ethoxyethoxy) group or a $C_1$-$C_8$ alkoxy group, a $C_2$-$C_8$ alkenyl group, a cyclohexyl group, or a tetrahydrofurfuryl group; $R_3$ is a $C_1$-$C_8$ alkyl group or a $C_2$-$C_8$ alkenyl group and the total number of unsaturated bond in $R_2$ and $R_3$ is 1;

c) 5% to 15% by weight of at least one alkali metal salt of Formula III and/or Formula IV;

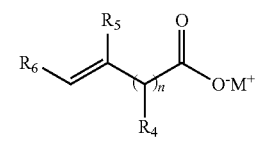

Formula III

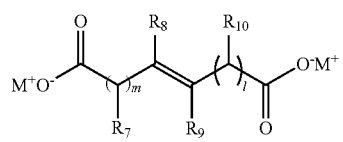

Formula IV wherein M is alkali metal selected from sodium, potassium and lithium; $R_4$, $R_5$, $R_6$, $R_7$, $R_8$, $R_9$ and $R_{10}$ are independently of each other hydrogen, methyl or ethyl group; n, m and l are independently of each other integer number from 0 to 3;

d) 0.5% to 10% by weight of at least one water soluble saturated polyvalent metallic salt having no unsaturated C≡C bond which can generate polyvalent metallic cations;

e) 1% to 10% by weight of at least one polymerization initiator; and f) 20% to 50% by weight of water, and the weight percentages of components a), b), c), d), e) and f) are based on a total weight of the composition;

wherein said water soluble polyvalent metallic cation is selected from ferric cation, or aluminum cation, or a mixture thereof.

2. The composition according to claim 1, wherein said monomer of Formula I is selected from acrylic acid, methacrylic acid, crotonic acid, maleic acid, allylacetic acid, 3-butenoic acid and 2-heptenoic acid or a mixture thereof.

3. The composition according to claim 1, wherein said monomer of Formula II is selected from methyl (meth)acrylate, ethyl(meth)acrylate, n-propyl(meth)acrylate, n-butyl (meth)acrylate, isobutyl(meth)acrylate, n-hexyl (meth)acrylate, 2-ethylhexyl (meth)acrylate, n-octyl(meth) acrylate, n-decyl(meth)acrylate, n-dodecyl (meth)acrylate, 2-hydroxyethyl(meth)acrylate, 2-hydroxypropyl(meth)acrylate, 3-hydroxypropyl(meth)acrylate, 2-methoxyethyl(meth)acrylate, 2-ethoxyethyl (meth)acrylate, 2-ethoxypropyl (meth)acrylate, 3-ethoxypropyl (meth)acrylate, tetrahydrofurfuryl(meth)acrylate, 2-(2-ethoxyethoxy)ethyl acrylate, cyclohexyl (meth)acrylate and isodecyl acrylate or a mixture thereof.

4. The composition according to claim 1, wherein said alkali metal salt of Formula III and/or Formula IV is selected from sodium acrylate, potassium acrylate, lithium acrylate, pentenoic acid sodium salt, crotonic acid sodium salt, 2-butenedioic acid disodium salt and potassium crotonate or a mixture thereof.

5. The composition according to claim 1, wherein said polymerization initiator is a redox initiator composed of at least one oxidant agent selected from sodium persulfate, lithium persulfate, potassium persulfate, ferric persulfate, magnesium persulfate, ammonium persulfate and at least one reducing agent selected from sodium sulfite, sodium bisulfite, potassium sulfite, potassium bisulfite, lithium sulfite, lithium bisulfite, ammonium sulfite, ammonium bisulfite, ferrous sulfate, ferrous chloride and a molar ratio of the oxidant agent and the reducing agent is from 1 to 1.2.

6. The composition according to claim 1, wherein said polymerization initiator is UV light initiator selected from benzoin methyl ether, benzoin ethyl ether and benzoin isopropyl ether, benzoin phenyl ether and benzoin acetate, acetophenone, 2,2-dimethoxyacetophenone and 1-dichloroacetophenone, benzyl dimethyl ketal and benzyl diethyl ketal, 2-methylanthraquinone, 2-ethylanthraquinone, 2-tert-butylanthraquinone, 1-chloroanthraquinone and 2-amylanthraquinone, 2,4,6-trimethylbenzoyldiphenylphosphine oxide, benzophenone and 4,4'-bis(N, N'-dimethylamino) benzophenone, 1-chloro-4-propoxy-9H-thioxanthen-9-one, 2-chlorothioxanthen-9-one, 2,4-diethyl-9H-thioxanthen-9-one, isopropyl-9H-thioxanthen-9-one, 10-methylphenothiazine, thioxanthen-9-one, 9(10H)-acridanone, 1-phenyl-1, 2-propanedione-2-O-benzoyloxime, 1-aminophenyl ketones, 1-hydroxycyclohexyl phenyl ketone, phenyl-1-hydroxyisopropylketone and 4-isopropylphenyl-1-hydroxyisopropylketone or a mixture thereof.

7. The composition according to claim 1, wherein the at least one polymerization inhibitor is selected from 2,2,6,6-tetramethyl-1-piperidinyloxy, butylated hydroxytoluene, mono-tert-butylhydroquinone, tertiary butylhydroquinone, di-tert-butylhydroquinone, p-benzoquinone, o-benzoquinone, nitrobenzene, dinitrochlorobenzene, beta-naphthylamine, ferric chloride, copper chloride, 2,2-diphenyl-2,4, 6-trinitrophenylhydrazine, hydroquinone, methyl hydroquinone, 4-methoxyphenol, p-tert-butylcatechol or a mixture thereof.

8. The composition according to claim 1, wherein the dynamic viscosity of said composition is from 0.01 Pa·s to 0.1 Pa·s at 25° C. under 101.325 KPa.

9. The composition according to claim 1, wherein the at least one water soluble saturated polyvalent metallic salt having no unsaturated C≡C bond is selected from the group consisting of ferric acetate, aluminum acetate, ferric trifluoroacetate, aluminum trifluoroacetate, ferric chloride, aluminium chloride, ferric sulfate, aluminium sulfate, and mixtures thereof.

10. The composition according to claim 1, wherein said water soluble polyvalent metallic cation is a ferric cation.

11. A process of fabricating a three-dimensional object, comprising
i) dispensing a build material in a layer, wherein the build material comprises a building material composition and a support material composition, and wherein the support material composition comprises the composition according to claim 1;

ii) curing the layer dispensed in step i);
iii) repeating step i) and ii) so as to sequentially form a plurality of the layers in a configured pattern corresponding to a shape of the object; and
iv) removing a cured support material formed by the support material composition from the build material.

12. The process according to claim 11, wherein the polymerization initiator is a redox initiator and the curing of the layer dispensed in step i) is done by heating.

13. The process according to claim 12, wherein a temperature of the heating is from 25° C. to 100° C.

14. The process according to claim 11, wherein the polymerization initiator is a UV light initiator and the curing of the layer dispensed in step i) is done by UV light.

15. The process according to claim 14, wherein said UV light has a wavelength of from 300 nanometer to 400 nanometer.

16. The process according to claim 11, wherein the removing is done by contacting the cured support material with an acidic aqueous solution.

17. The process according to claim 16, wherein the said acidic aqueous solution comprises sulphuric acid, acetic acid, hydrochloric acid, nitric acid, trifluoroacetic acid, phosphoric acid, propionic acid, lactic acid, phosphoric acid, glycolic acid, perchloric acid, chloric acid, fluorosilicic acid, permanganic acid, metaphosphoric acid or a mixture thereof.

18. A three-dimensional object obtained by the process according to claim 11.

* * * * *